(12) United States Patent
Avtomonov et al.

(10) Patent No.: US 11,685,805 B2
(45) Date of Patent: Jun. 27, 2023

(54) AQUEOUS DISPERSION OF POLYURETHANE

(71) Applicant: COVESTRO DEUTSCHLAND AG, Leverkusen (DE)

(72) Inventors: Evgeny Avtomonov, Leverkusen (DE); Zhirong Fan, Jiangsu Province (CN); Rolf Irnich, Bergheim (DE); Sujuan Zhai, Shanghai (CN)

(73) Assignee: Covestro Deutschland AG, Leverkusen (DE)

( * ) Notice: Subject to any disclaimer, the term of this patent is extended or adjusted under 35 U.S.C. 154(b) by 791 days.

(21) Appl. No.: 16/468,387

(22) PCT Filed: Dec. 18, 2017

(86) PCT No.: PCT/EP2017/083369
§ 371 (c)(1),
(2) Date: Jun. 11, 2019

(87) PCT Pub. No.: WO2018/114838
PCT Pub. Date: Jun. 28, 2018

(65) Prior Publication Data
US 2021/0130532 A1  May 6, 2021

(30) Foreign Application Priority Data

Dec. 19, 2016 (CN) .................. 201611252062.7

(51) Int. Cl.
| | | |
|---|---|---|
| *C09D 175/06* | (2006.01) | |
| *C08G 18/48* | (2006.01) | |
| *C08G 18/75* | (2006.01) | |
| *C08G 18/08* | (2006.01) | |
| *C08G 18/12* | (2006.01) | |
| *C08G 18/28* | (2006.01) | |
| *C08G 18/44* | (2006.01) | |
| *C08G 18/72* | (2006.01) | |
| *C08G 18/73* | (2006.01) | |
| *C08J 3/07* | (2006.01) | |
| *C09D 175/08* | (2006.01) | |
| *D06N 3/14* | (2006.01) | |

(52) U.S. Cl.
CPC ....... *C08G 18/758* (2013.01); *C08G 18/0814* (2013.01); *C08G 18/12* (2013.01); *C08G 18/283* (2013.01); *C08G 18/44* (2013.01); *C08G 18/4829* (2013.01); *C08G 18/4833* (2013.01); *C08G 18/722* (2013.01); *C08G 18/73* (2013.01); *C08J 3/07* (2013.01); *C09D 175/06* (2013.01); *C09D 175/08* (2013.01); *D06N 3/14* (2013.01); *C08J 2375/08* (2013.01); *D06N 2209/123* (2013.01); *D06N 2209/128* (2013.01)

(58) Field of Classification Search
CPC .. C09D 175/06; C09D 175/08; C08G 18/758; C08G 18/73; C08G 18/722; C08G 18/4829; C08G 18/283; C08G 18/44; C08G 18/0814
See application file for complete search history.

(56) References Cited

U.S. PATENT DOCUMENTS

| | | |
|---|---|---|
| 5,231,116 A | 7/1993 | Sano et al. |
| 5,629,402 A | 5/1997 | Pedain et al. |
| 6,586,523 B1 | 7/2003 | Blum et al. |
| 2003/0019529 A1 | 10/2003 | Lubnin et al. |
| 2005/0256261 A1 | 11/2005 | Arndt et al. |
| 2008/0102314 A1 | 5/2008 | Lomax et al. |
| 2009/0030146 A1 | 1/2009 | Berezkin et al. |
| 2010/0273939 A1 | 10/2010 | Stollmaier et al. |
| 2011/0015292 A1 | 1/2011 | Radhakrishnan et al. |
| 2012/0142240 A1 | 6/2012 | Eling et al. |
| 2013/0053511 A1 | 2/2013 | Rashid et al. |
| 2014/0243559 A1 | 8/2014 | Lorenz et al. |
| 2014/0342624 A1 | 11/2014 | Dorr et al. |
| 2015/0315527 A1 | 11/2015 | Malaba et al. |

FOREIGN PATENT DOCUMENTS

| | | |
|---|---|---|
| CA | 2253119 A1 | 5/1999 |
| CN | 103328524 A | 9/2013 |
| CN | 103497308 A | 1/2014 |
| EP | 1426391 A1 | 6/2004 |
| JP | 2009132832 A | 6/2009 |
| JP | 2012077255 A | 4/2012 |
| WO | 2011132581 A1 | 7/2013 |

OTHER PUBLICATIONS

International Search Report—PCT/EP2017/083369 dated Mar. 13, 2018; Bergmeier, Martin.

*Primary Examiner* — Michael L Leonard
(74) *Attorney, Agent, or Firm* — The Webb Law Firm

(57) ABSTRACT

The present invention relates to an aqueous dispersion of polyurethane and a method for preparing the same, use thereof in a coating composition, and a coated product. The aqueous dispersion of polyurethane comprises a polyurethane polymer which is obtained by a reaction of a reaction mixture comprising a polyurethane prepolymer A) and an isocyanate-reactive component B), said polyurethane prepolymer A) being obtained by a reaction comprising the following components: A1) a polyisocyanate which has a functionality of not less than 2; and A2) a multifunctional polyether polyol which has a functionality of not less than 3 in an amount of 1% to 30% by weight, based on the amount of said reaction mixture as 100% by weight. The aqueous dispersion of polyurethane according to the present invention is well dispersed, and is capable of forming a coat with good waterproof, moisture permeability and washing resistance.

18 Claims, No Drawings

AQUEOUS DISPERSION OF POLYURETHANE

CROSS REFERENCE TO RELATED APPLICATIONS

This application is the U.S. National Phase application under 35 U.S.C. § 371 of International Application No. PCT/EP2017/083369 filed Dec. 18, 2017, which claims priority to CN 201611252062.7 filed Dec. 19, 2016, the disclosures of both applications are incorporated herein by reference.

FIELD OF THE INVENTION

The present invention relates to an aqueous dispersion of polyurethane and a method for preparing the same, use thereof in a coating composition, and a coated product.

BACKGROUND OF THE INVENTION

"Waterproof while moisture permeability" or "waterproof while moisture permeable" means that water from the outside does not enter the fabric, while sweat from human body can permeate in the form of water vapor through the fabric to the environment during wearing, allowing the wearer feeling dry and comfortable. In recent years, the waterproof and moisture permeable fabric is very popular due to its waterproof and moisture permeable performance, especially in the fields of outdoors clothing and athletic shoes.

The waterproof and moisture permeable fabric generally comprises three main categories: waterproof and moisture permeable fabric having microporous structure, coated waterproof and moisture permeable fabric and laminated composite waterproof and moisture permeable fabric. The coated waterproof and moisture permeable fabric has become the predominant trend of waterproof and moisture permeable fabric due to its simple processability.

A coating composition used to form the coated waterproof and moisture permeable fabric can be polytetrafluoroethylene, polyester, polyamide or polyurethane. The coat formed by applying a coating composition comprising an aqueous dispersion of polyurethane on a fabric does not allow droplets, such as rainwater, passing through, but allows individual water vapor molecule passing through by movement of molecular diffusion. Therefore, the coating composition formed by an aqueous dispersion of polyurethane can be used to produce the coated waterproof and moisture permeable fabric. In addition, the aqueous dispersion of polyurethane is broadly investigated and applied due to the advantageous properties such as wear resistance, chemical resistance, low temperature resistance and the like of the coated waterproof and moisture permeable fabric formed therefrom.

EP1426391 A1 discloses an aqueous dispersion of polyurethane prepared from components of a polyurethane prepolymer terminated with an isocyanate comprising an ionic hydrophilic group and a polyurethane prepolymer terminated with an isocyanate comprising a non-ionic hydrophilic group. A coating composition is obtained by mixing an aqueous dispersion of polyurethane with an organic solvent, e.g. N-methyl pyrrolidone.

U.S. Pat. No. 5,629,402 discloses a coating composition comprising polyurethane and an organic solvent, e.g. N-methyl pyrrolidone, wherein the polyurethane comprises ionic groups and polyethylene oxide units.

The coating compositions in the above two patents comprise an organic solvent. The toxicity of the organic solvent damages not only the health of operators, but also the health of wearers of the fabric.

Accordingly, coating compositions formed from an aqueous dispersion of polyurethane without using an organic solvent have been developed. An aqueous dispersion of polyurethane comprising hydrophilic group is more intensively investigated, as the polyurethane contained in the dispersion can be dispersed in water without the addition of external emulsifying agent.

US2003/0195293 A1 discloses an aqueous dispersion of polyurethane, comprising polyalkylene oxide side chain units in an amount of 12-80 wt.-% and polyethylene oxide backbone units in an amount of less than 25 wt.-%, based on the amount of the aqueous dispersion of polyurethane as 100 wt.-%. The alkylene oxide groups in the polyalkylene oxide side chain units have 2-10 carbon atoms, and are unsubstituted and/or substituted. The alkylene oxide groups contain not less than 50 wt.-% of ethylene oxide. Water vapor permeability up to 500 g/m²/24 h can be achieved with a coat formed from the above aqueous dispersion of polyurethane.

WO2006/075144 A1 discloses an aqueous dispersion of polyurethane prepared from components of diisocyanate, diamine and polyether polyol. The polyether polyol comprises $(CH_2)_mO^-$ units, wherein m may be same or different, and m is 3 or 4. The polyether polyol is in an amount of not less than 70 wt.-%, the ether oxygen atoms in the polyether polyol are in an amount of not less than 15 wt.-%, and the terminal amino radicals of the aqueous dispersion of polyurethane are in an amount of not more than 0.2 wt.-%, based on the solid content of the polyurethane as 100 wt.-%.

WO2011/132581 A1 discloses an aqueous dispersion of polyurethane prepared from an isocyanate terminated prepolymer and a chain extender. The isocyanate terminated prepolymer is obtained by the reaction of polytetrahydrofuran, a polyol containing an oxyethylene group, an alkylene diol containing a branched alkylene group, an isocyanate and optionally a polyol containing a carboxyl group.

JP2012/077255 discloses an aqueous dispersion of polyurethane prepared from the following components: 50 wt.-% or more of polyisocyanate free of multi-rings (e.g. containing neither an aromatic ring nor an aliphatic ring, or containing only one aromatic ring or only one aliphatic ring), and a polyethoxy polyol having a branched structure. The polyethoxy polyol has two hydroxyl groups and/or isocyanate groups as the terminal groups, with multiple ethoxy groups on the side chain. The resultant aqueous dispersion of polyurethane has a functionality of two and a branched structure.

WO2013/037767A2 discloses an aqueous dispersion of polyurethane obtained from the reaction of a polyurethane prepolymer and an isocyanate-reactive compound. The polyurethane prepolymer is obtained from the reaction of a polyol and a polyisocyanate. The polyol is a polyester polyol. The polyisocyanate comprises dicyclohexyl methane diisocyanate in an amount of not less than 50 wt.-%, based on the total weight of the polyisocyanate. The isocyanate-reactive compound comprises a sulfonate group.

The aqueous dispersions of polyurethane free of organic solvent stated above comprise abundant of hydrophilic groups, e.g. polyethoxy groups of $(CH_2)_2O^-$ units, where the polyethoxy groups tend to crystalize due to the stereospecificity and close packing, which, on the one hand, results in a difficult dispersion of the aqueous dispersion of polyurethane in water and a gelation tendency, and on the other hand, results in an increased viscosity and decreased solid content of the aqueous dispersion of polyurethane, such that the coat formed from the aqueous dispersion of polyurethane has a reduced thickness and water-resistance. To ensure that the aqueous dispersion of polyurethane doesn't undergo a gelation or an increase of viscosity, the content of hydrophilic groups in the aqueous dispersion of polyurethane needs to be controlled within an appropriate range.

Therefore, an aqueous dispersion of polyurethane having good dispersity with balanced waterproof and moisture permeability is desirable in the art.

DETAILED DESCRIPTION OF THE INVENTION

The term aqueous dispersion of polyurethane is used alternative to/equivalent with aqueous dispersion of polyurethane urea and/or aqueous dispersion of polyurea polyurea and/or aqueous dispersion of polyurea.

One object of the present invention is to provide an aqueous dispersion of polyurethane and a method for preparing the same, use thereof in a coating composition, and a coated product.

According to an embodiment of the present invention, the aqueous dispersion of polyurethane comprises a polyurethane polymer which is obtained by reaction of a reaction mixture comprising a polyurethane prepolymer A) and an isocyanate-reactive component B), said polyurethane prepolymer A) being obtained by a reaction comprising the following components:

A1) a polyisocyanate which has a functionality of not less than 2; and

A2) a multifunctional polyether polyol which has a functionality of not less than 3 in an amount of 1% to 30% by weight, based on the amount of said reaction mixture as 100% by weight.

According to an embodiment of the present invention, a process for preparing the aqueous dispersion of polyurethane of the present invention is provided, comprising the steps of:
 a. reacting component A1) with component A2) to obtain the polyurethane prepolymer A);
 b. reacting said polyurethane prepolymer A) with the isocyanate-reactive component B) to obtain a polyurethane polymer; and
 c. introducing water prior to, during or after step b to obtain said aqueous dispersion of polyurethane.

According to an embodiment of the present invention, a coating composition is provided by the present invention, comprising the aqueous dispersion of polyurethane according to the present invention.

The coating composition may further comprise an additive. The additive is one or more selected from the group consisting of co-adhesive, thickener, adhesion promoter, lubricant, wetting additive, dye, light stabilizer, aging inhibitor, pigment, flow control agent, antistatic agent, UV absorbent, film-forming auxiliary, antifoaming agent and plasticizer.

The coating composition may further comprise an aqueous dispersion other than the aqueous dispersion of polyurethane, e.g. aqueous dispersion of polyester, aqueous dispersion of polyurethane, aqueous dispersion of polyurethane-polyacrylate, aqueous dispersion of polyacrylate, aqueous dispersion of polyether, aqueous dispersion of polyester-polyacrylate, aqueous dispersion of alkyd resin, aqueous dispersion of polyamide/imide or aqueous dispersion of polyepoxide.

Preferably, a coat formed from the coating composition has a water vapor permeability of 5000-25000 $g/m^2/24$ h, most preferably 10000-20000 $g/m^2/24$ h, and a hydrostatic head not less than 7000 mm.

According to an embodiment of the present invention, the present invention provides the use of the aqueous dispersion of polyurethane for preparing a coated product.

According to an embodiment of the present invention, the present invention provides a coated product, comprising a substrate and a coating composition comprising the aqueous dispersion of polyurethane according to the present invention applied on the substrate.

Preferably, the substrate is selected from the group consisting of wood, plastic, metal, glass, fabric, leather, paper, glass fiber, polymer fiber or graphite fiber, preferably fabric.

The fabric is preferably selected from the group consisting of wool fabric, cotton fabric or synthetic fabric.

According to an embodiment of the present invention, the present invention provides a method for preparing a coated product, comprising applying a coating composition comprising the aqueous dispersion of polyurethane according to the present invention onto a substrate.

Preferably, the coated substrate could be contacted to a further substrate, which also could be part of the first substrate, to build a sandwich structure. The coating composition preferably acts as adhesive in the sandwich structure between the two substrates.

The applying may be spray coating, e.g. air pressure spraying, airless spraying or electrostatic spraying, or spreading, roller coating, dip coating, injecting, printing or knife coating.

In order to provide a coat with good moisture permeability, the aqueous dispersion of polyurethane for forming the coat generally comprises abundant of hydrophilic groups. However, the abundant of hydrophilic groups result in a greatly increased viscosity and decreased solid content of the aqueous dispersion of polyurethane, such that the coat formed by the aqueous dispersion of polyurethane is thinned and the waterproof thereof is decreased. In order to ensure that the aqueous dispersion of polyurethane doesn't have a too high viscosity, the content of hydrophilic groups in the aqueous dispersion of polyurethane should be controlled within an appropriate range.

Appropriate amount of multifunctional polyether polyol, especially preferably a polyether polyol with a star structure having a functionality of 6, is introduced into the aqueous dispersion of polyurethane according to the present invention, allowing the aqueous dispersion of polyurethane not only having abundant of hydrophilic groups, but also devoid of too high viscosity of the aqueous dispersion of polyurethane. On the one hand, the dispersity of the polyurethane polymer in water is ensured; and on the other hand, the low viscosity and high solid content of the aqueous dispersion of polyurethane ensure a proper thickness of the coat formed by the aqueous dispersion of polyurethane, so as to ensure the waterproof of the coat. On the other hand, the moisture passages in the coat formed by the aqueous dispersion of polyurethane are increased and thus the moisture permeability of the coat is enhanced by increasing the hydrophilic groups in the aqueous dispersion of polyurethane. In addition, the hydrophilic groups increased in the aqueous dispersion of polyurethane can also be used as crosslinkable groups for crosslinking reaction, so as to increase the crosslinking degree of the aqueous dispersion of polyurethane, increasing the crosslinking density and strength of the coat formed by the aqueous dispersion of polyurethane. In this way, on the one hand, the waterproof of the coat is increased; while on the other hand, the adhesion and stability of the coat on the substrate surface are increased, and the washing resistance of the coat is enhanced.

Therefore, the present invention in fact provides an aqueous dispersion of polyurethane having good dispersity with balanced waterproof, moisture permeability and washing resistance.

The present invention provides an aqueous dispersion of polyurethane, comprising a polyurethane polymer which is obtained by a reaction of a reaction mixture comprising a polyurethane prepolymer A) and an isocyanate-reactive component B), said polyurethane prepolymer A) being obtained by a reaction comprising the following components:
A1) a polyisocyanate which has a functionality of not less than 2; and
A2) a multifunctional polyether polyol which has a functionality of not less than 3 in an amount of 1% to 30% by weight, based on the amount of said reaction mixture as 100% by weight. The present invention further provides a method for preparing the aqueous dispersion of polyurethane, a coating composition comprising the aqueous dispersion of polyurethane, a coated product obtained by applying the coating composition onto a substrate and a method for preparing the coated product.

The solid content of the aqueous dispersion of polyurethane according to the present invention may be 20% to 70% by weight, preferably 25% to 60% by weight, further preferably 30% to 50% by weight, and most preferably 30 to 35% by weight.

The viscosity of said aqueous dispersion of polyurethane is preferably lower than 3,000 mPa·s, most preferably lower than 1,000 mPa·s.

The pH of said aqueous dispersion of polyurethane is preferably less than 9.0, further preferably less than 7.5, and most preferably less than 7.2.

The amount of said component A1) may be 5% to 70% by weight, preferably 5% to 40% by weight, further preferably 5% to 35% by weight, and most preferably 10% to 30% by weight, based on the amount of said reaction mixture as 100% by weight.

The amount of said component A2) is preferably 1% to 15% by weight, further preferably 1% to 12% by weight, and most preferably 1.5% to 10% by weight, based on the amount of said reaction mixture as 100% by weight.

The amount of said isocyanate-reacting component B) may be 0.1% to 65% by weight, preferably 0.1% to 25% by weight, further preferably 0.1% to 15% by weight, and most preferably 0.1% to 13.5% by weight, based on the amount of said reaction mixture as 100% by weight.

The reaction components of said polyurethane prepolymer A) may further comprise component A3) which is selected from polymeric polyols different from said multifunctional polyether polyol. The amount of said component A3) may be 55% to 90% by weight, preferably 60% to 90% by weight, and most preferably 65% to 85% by weight, based on the amount of said reaction mixture as 100% by weight.

The reaction components of said polyurethane prepolymer A) may further comprise component A4) which may be a hydroxyl functional compound having a molecular weight of 32 to 400 g/mol.

The reaction components of said polyurethane prepolymer A) may further comprise component A5) which may be an isocyanate-reacting anionic hydrophilic agent or a potential anionic hydrophilic agent.

The reaction mixture of said polyurethane prepolymer A) and the isocyanate-reacting component B) may further comprise an amino functional compound C) having a molecular weight of 32 to 400 g/mol.

The aqueous dispersion of polyurethane according to the present invention comprises a polyurethane polymer, obtained preferably by the reaction of a reaction mixture comprising polyurethane prepolymer A) and isocyanate-reactive component B):
polyurethane prepolymer A) prepared from a reaction comprising the following components:
A1) a polyisocyanate which has a functionality of not less than 2;
A2) a multifunctional polyether polyol which has a functionality of not less than 3 in an amount of 1% to 30% by weight, based on the amount of said reaction mixture as 100% by weight;
A3) optionally a polymeric polyol different from the multifunctional polyether polyol;
A4) optionally a hydroxyl functional compound having a molecular weight of 32-400 g/mol; and
A5) optionally an isocyanate-reactive anionic hydrophilizing agent or a potential anionic hydrophilizing agent,
wherein a part or all of the free isocyanate groups (NCO) of the polyurethane prepolymer A) are reacted with the following substances for chain extension:
B) an isocyanate-reactive component, preferably an anionic hydrophilizing agent or a potential anionic hydrophilizing agent, and
C) optionally an amino functional compound having a molecular weight of 32-400 g/mol.

In a preferable embodiment for preparing the aqueous dispersion of polyurethane, the reaction mixture comprises:
5-40 wt.-% of component A1),
1-15 wt.-% of A2),
55-90 wt.-% of A3),
0.5-20 wt.-% of component A4) and C),
0.1-25 wt.-% of components A5) and B), wherein 0.1-5 wt.-% of an anionic hydrophilizing agent or a potential hydrophilizing agent from A5) and/or B) are used,
wherein all the amounts of the components above are calculated based on the amount of the reaction mixture as 100 wt.-%.

In another preferable embodiment for preparing another aqueous dispersion of polyurethane, the reaction mixture comprises:
5-35 wt.-% of component A1),
1-12 wt.-% of A2),
60-90 wt.-% of A3),
0.5-15 wt.-% of components A4) and C),
0.1-15 wt.-% of components A5) and B), wherein 0.2-4 wt.-% of an anionic hydrophilizing agent or a potential hydrophilizing agent from A5) and/or B) are used,
wherein all the amounts of the components above are calculated based on the amount of the reaction mixture as 100 wt.-%.

In yet another preferable embodiment for preparing the aqueous dispersion of polyurethane, the reaction mixture comprises:
10-30 wt.-% of component A1),
1.5-10 wt.-% of A2),
65-85 wt.-% of A3),
0.5-14 wt.-% of components A4) and C), 0.1-13.5 wt.-% of components A5) and B), wherein 0.5-3.0 wt.-% of an anionic hydrophilizing agent or a potential hydrophilizing agent from A5) and/or B) are used, wherein all the amounts of the components above are calculated based on the amount of the reaction mixture as 100 wt.-%.

The molar ratio of isocyanate groups of the polyurethane prepolymer A) to isocyanate-reactive groups of the isocyanate-reactive component B) can be 1.05-3.5, preferably 1.2-3.0, most preferably 1.3-2.5.

Polyurethane Prepolymer A)

Component A1) Polyisocyanate

The polyisocyanate preferably has a functionality of 2-4.

The polyisocyanate is preferably selected from the group consisting of aliphatic polyisocyanate and/or alicyclic polyisocyanate, further preferably alicyclic polyisocyanate.

The alicyclic polyisocyanate is preferably in an amount of not less than 25 wt.-%, based on the amount of component A1) as 100 wt.-%.

The alicyclic polyisocyanate is further preferably in an amount of not less than 50 wt.-%, based on the amount of component A1) as 100 wt.-%.

The polyisocyanate is most preferably a combination of an alicyclic polyisocyanate and an aliphatic polyisocyanate, a combination of an alicyclic polyisocyanate and an aromatic polyisocyanate, or a combination of an alicyclic polyisocyanate, an aliphatic polyisocyanate and an aromatic polyisocyanate.

The aliphatic polyisocyanate is one or more selected from the group consisting of hexamethylene diisocyanate (HDI), 2,2-dimethylpentamethylene diisocyanate, 2,2,4-trimethylhexamethylene diisocyanate, butylene diisocyanate, 1,3-butadiene-1,4-diisocyanate, 2,4,4-trimethyl 1,6-hexamethylene diisocyanate, 1,6,11-undecane triisocyanate, 1,3,6-hexamethylene triisocyanate, 1,8-diisocyanato-4-methyl isocyanate octane, bis(ethyl isocyanate) carbonate, bis(ethyl isocyanate) ether, lysine methyl diisocyanate and lysine triisocyanate.

The aliphatic polyisocyanate is preferably hexamethylene diisocyanate (HDI).

The alicyclic polyisocyanate is one or more selected from the group consisting of isophorone diisocyanate (IPDI), isomeric bis(4,4'-isocyanatocyclohexyl) methane or a mixture of the isomers thereof in arbitrary amounts, 1,4-cyclohexylene diisocyanate, 1,3-bis (isocyanatomethyl) benzene (XDI), 1,3- and/or 1,4-bis (2-isocyanatoprop-2-yl)-benzene (TMXDI), norbornane diisocyanate (NBDI), hydrogenated xylene diisocyanate ($H_6$XDI), 1,4-cyclohexyl diisocyanate ($H_6$PPDI), 1,5-pentylene diisocyanate (PDI) and dicyclohexyl methane diisocyanate.

The alicyclic polyisocyanate preferably comprises at least two alicyclic rings.

The alicyclic polyisocyanate is most preferably dicyclohexyl methane diisocyanate.

The aromatic polyisocyanate is one or more selected from the group consisting of toluene diisocyanate (TDI), 2,4- and/or 2,6-tolylene diisocyanate, 1,5-naphthylenediisocyanate, diphenylmethane-2,2'- and/or -2,4'- and/or 4,4'-diisocyanate (MDI), hydrogenated toluene diisocyanate ($H_6$TDI) and 1,4-phenylene diisocyanate.

The aromatic polyisocyanate is preferably one or more of toluene diisocyanate (TDI) and diphenylmethane-2,2'- and/or -2,4'- and/or 4,4'-diisocyanate (MDI).

The polyisocyanate can also be a modified polyisocyanate having a structure of uretdione, isocyanurate, carbamate, allophanate, biuret, imino-oxadiazinedione and/or oxadiazinetrione.

The polyisocyanate may also be an unmodified polyisocyanate, such as 4-isocyanatomethyl octylene 1,8-diisocyanate (nonyl triisocyanate) or triphenyl methyl 4,4',4"-triisocyanate.

Component A2) Multifunctional Polyether Polyol

The number-average molecular weight of said multifunctional polyether polyol may be 500 to 12,000 g/mol, preferably 500 to 6,000 g/mol, measured at 23° C. by gel permeation chromatography with tetrahydrofuran as the mobile phase and comparing to the reference material polystyrene.

The functionality of said multifunctional polyether polyol is preferably 3 to 8, further preferably 3 to 6, and most preferably 6.

The amount of said multifunctional polyether polyol is preferably 1% to 15% by weight, further preferably 1% to 12% by weight, and most preferably 1% to 10% by weight, based on the amount of the reaction mixture as 100% by weight.

The multifunctional polyether polyol is preferably obtained by a reaction comprising ethylene oxide and an initiator. The process of preparing the multifunctional polyether polyol may refer to CN104004176A.

The reaction temperature for preparing the multifunctional polyether polyol can be 70-170° C., preferably 100-160° C.

The reaction of preparing the multifunctional polyether polyol is preferably carried out without using a solvent or other auxiliary agent.

Without using a solvent or other auxiliary agent in the sense of the invention should be understood as no solvent or auxiliary agent is introduced intentionally, whereas the residual trace amount of solvent or auxiliary agent from the process of preparing the ethylene oxide and/or initiator is not deemed as using a solvent or an auxiliary agent.

The initiator is generally solid at room temperature, and can also be used as an aqueous solution in order to promote the reaction of preparing the multifunctional polyether polyol. Dehydration can be carried out prior to or after the addition of ethylene oxide, for which dehydration a steam stripping can be used.

Preferably, the initiator, also called "starter", comprises H-active compounds which are able of adding epoxy-groups to the molecule they react with.

The reaction for preparing the multifunctional polyether polyol can further comprise a catalyst.

The catalyst can be used in an amount of 0.004-1.0 wt.-%, preferably 0.02-1.0 wt.-%, based on the amount of the reaction product as 100 wt.-%.

The catalyst is one or more selected from the group consisting of alkaline catalysts, such as an alkali metal hydride, an alkali metal carboxylate, an alkali metal hydroxide, an alkali metal alkoxide and an amine.

The alkali metal carboxylate is preferably a mono-functional alkali metal carboxylate.

The alkali metal hydroxide is preferably one or more selected from the group consisting of sodium hydroxide, potassium hydroxide and cesium hydroxide, most preferably potassium hydroxide.

The alkali metal alkoxide is preferably an alkali metal alkoxide of a mono-functional alcohol.

The amine is preferably one or more selected from the group consisting of N,N-dimethyl benzyl amine, dimethyl amino propanol, N-methyl diethanolamine, trimethyl amine, triethylamine, N,N-dimethyl cyclohexyl amine, N-methyl pyrrolidine, N,N, N',N'-tetramethyl ethylene diamine, diazabicyclo-[2,2,2] octane, 1,4-lupetazin, N-methyl morpholine, unsubstituted imidazole and alkyl substituted imidazole derivative.

The amine is further preferably imidazole and/or alkyl substituted imidazole derivative.

The alkyl substituted imidazole derivative is preferably N-methyl imidazole.

The ethylene oxide is preferably used in such an amount that the multifunctional polyether polyol has a content of oxyethylene group of 18-100 wt.-%, further preferably 30-85 wt.-%, based on the amount of the multifunctional polyether polyol as 100 wt.-%.

The reaction for preparing the multifunctional polyether polyol can further involve an alkylene oxide other than ethylene oxide.

The alkylene oxide other than ethylene oxide is one or more selected from the group consisting of propylene oxide, 1-butylene oxide, 2,3-butylene oxide, 2-methyl-1,2-propylene oxide (epoxy isobutane), 1-epoxy pentane, 2,3-epoxy pentane, 2-methyl-1,2-butylene oxide, 3-methyl-1,2-butylene oxide, I-epoxy hexane, 2,3-epoxy hexane, 3,4-epoxy hexane, 2-methyl-1,2-epoxy pentane, 4-methyl-1,2-epoxy pentane, 2-ethyl-1,2-butylene oxide, 1-epoxy heptane, 1-epoxy octane, I-epoxy nonane, 1-epoxy decane, I-epoxy undecane, 1-epoxy dodecane, 4-methyl-1,2-epoxy pentane, butadiene monoxide, isoprene monooxide, epoxy cyclopentane, epoxy cyclohexane, epoxy cycloheptane, epoxy cyclooctane, styrene oxide, methyl styrene oxide and epoxy pinane. Propylene oxide and/or butylene oxide are most preferable.

The initiator can be an initiator having a melting point not less than 40° C. The initiator having a melting point of not less than 40° C. is preferably one or more selected from the group consisting of monosaccharides, oligosaccharides, polysaccharides, pentaerythritol, dipentaerythritol, tripentaerythritol, trimethylolethane, trimethylolpropane, sorbitol, 1,12-dodecanediol, 1,2-decanediol, 1,10-decanediol, cyclic polyols, aromatic hydroxyl compounds, polyamines, compounds having carboxylic acid group(s), and compounds having hydroxyl and a carboxylic acid group(s).

The cyclic polyol is preferably selected from inositol.

The aromatic hydroxyl compound is preferably one or more selected from the group consisting of phenol, hydroquinone, catechol, resorcinol, 1,3,5-trihydroxy benzene, bisphenol A, bisphenol F, a methylol-containing condensation product of formaldehyde and phenol or melamine or urea, Mannich base and a compound with high functionality based on the hydrolysate of hydrogenated starch.

The polyamine is preferably selected from the group consisting of a condensation product based on polycyclic aniline with high functionality and formaldehyde and/or an isomer of toluylene diamine.

The compound having carboxylic acid group(s) is preferably one or more selected from the group consisting of malonic acid, glutaric acid and adipic acid.

The compound having hydroxyl and carboxyl acid group(s) is preferably one or more selected from the group consisting of isomers of hydroxybenzoic acid, isomers of methylol benzoic acid, isomers of dihydroxy benzoic acid, isomers of trihydroxy benzoic acid, mandelic acid, malic acid, citric acid, tartaric acid and mucic acid.

The initiator having a melting point not less than 40° C. used is more preferably one or more of pentaerythritol, sucrose, trimethylolpropane and sorbitol, most preferably sorbitol.

The initiator can also be an initiator having a melting point less than 40° C. The initiator having a melting point less than 40° C. is one or more selected from the group consisting of methanol, ethanol, I-propanol, 2-propanol, an aliphatic mono-alcohol in liquid form at room temperature, 1,2-propylene glycol, 1,3-propylene glycol, glycol, diethylene glycol, dipropylene glycol, 1,2-butanediol, 1,3-butanediol, 1,4-butanediol, hexanediol, pentanediol, 3-methyl-1,5-pentanediol, glycerol, triethanolamine and water.

The initiator having a melting point not less than 40° C. can also be used as a mixture with the initiator having a melting point less than 40° C.

When the initiator having a melting point not less than 40° C. is used as a mixture with the initiator having a melting point less than 40° C., the initiator having a melting point not less than 40° C. is in an amount of not less than 70 wt.-%, and the initiator having a melting point less than 40° C. is in an amount of not more than 30 wt.-%, based on the amount of the initiator as 100 wt.-%.

The multifunctional polyether polyol preferably has the following structure:

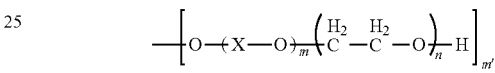

wherein,
m is 0 to 50;
n is 1 to 50;
m' is not less than 3;
X is one or more selected from the group consisting of propyl, isopropyl, butyl, pentyl, hexyl, heptyl, octyl, nonyl, decyl, undecyl, dodecyl, cyclopentyl, cyclohexyl, cycloheptyl, cyclooctyl, styryl, methylstyryl and pinanyl. X could also be ethyl.

Said m is preferably 0 to 10, most preferably 1 to 3.
Said n is preferably 1 to 10, most preferably 7 to 10.
Said m' is preferably 3 to 8, further preferably 3 to 6, most preferably 6.
Said X is preferably propyl and/or butyl.
Said multifunctional polyether polyol is preferably a polyol with a star structure having a functionality of 6.
Said multifunctional polyether polyol is most preferably polyoxyethylene polyol having a functionality of 6 and/or polyoxypropylene polyol having a functionality of 6.

Component A3), Polymeric Polyol Different from Said Multifunctional Polyether Polyol The component A3), a polymeric polyol different from said multifunctional polyether polyol, can be one or more selected from the group consisting of a polyester polyol, polyacrylate polyol, polyurethane polyol, polycarbonate polyol, polyether glycol, polyester polyacrylate polyol, polyurethane polyacrylate polyol, polyurethane polyester polyol, polyurethane polyether polyol, polycarbonate polyether polyol, polyurethane polycarbonate polyol and polyester polycarbonate polyol conventionally used in the preparation of an aqueous dispersion of polyurethane.

The component A3), a polymeric polyol different from the multifunctional polyether polyol, is preferably one or more of polycarbonate polyol, polyester polyol and low-functional polyether polyol.

The component A3) preferably has a functionality of less than 3, or preferably or less than 2.8, or preferably of less than 2.5.

The component A3), a polymeric polyol different from the multifunctional polyether polyol, is most preferably polycarbonate polyol and/or polyester polyol.

Polycarbonate Polyol

The weight ratio of the multifunctional polyether polyol to polycarbonate polyol can be 1:4-1:10, preferably 1:4-1:6.

The polycarbonate polyol may have a number-average molecular weight of 400-8000 g/mol, preferably 600-3000 g/mol.

The polycarbonate polyol is selected from the group consisting of hydroxyl-containing polycarbonate, preferably polycarbonate diol.

The polycarbonate diol can be obtained from carbonic acid derivatives, such as diphenyl carbonate or dimethyl carbonate, and polyol, preferably diol.

The diol can be glycol, 1,2- and 1,3-propylene glycol, 1,3- and 1,4-butanediol, 1,6-hexanediol, 1,8-octanediol, neopentyl glycol, 1,4-bishydroxylmethyl cyclohexane, 2-methyl-1,3-propylene glycol, 2,2,4-trimethyl-1,3-pentanediol, dipropylene glycol, polypropylene glycols, dibutylene glycol, polybutylene glycols, bisphenol A or a lactone-modified diol above.

The diol preferably comprises 40-100 wt.-% of hexanediol. The hexanediol is preferably 1,6-hexanediol and/or a hexanediol derivative. The 1,6-hexanediol derivative further comprises an ester or ether group in addition to the OH terminal group, which can be obtained through hexanediol with equivalent amount or excessive amount of caprolactone, or through a self-etherification of hexanediol which produces a di- or tri-hexanediol.

Polyester Polyol

The weight ratio of the multifunctional polyether polyol to polyester polyol can be 1:20-1:40, preferably 1:30-1:40.

The polyester polyol can be a linear polyester diol or a slightly branched polyester polyol, prepared from components comprising: aliphatic, alicyclic or aromatic di- or polycarboxylic acids, such as succinic acid, methyl succinic acid, glutaric acid, adipic acid, pimelic acid, suberic acid, azelaic acid, sebacic acid, nonane dicarboxylic acid, decane dicarboxylic acid, terephthalic acid, isophthalic acid, o-phthalic acid, tetrahydro-o-phthalic acid, hexahydro-o-phthalic acid, cyclohexane dicarboxylic acid, maleic acid, fumaric acid, malonic acid or trimellitic acid; anhydride, such as o-phthalic anhydride, trimellitic anhydride or succinic anhydride or a mixture thereof; and polyol with low molecular weight, and optionally polyol with higher functionality, such as trimethylolpropane, glycerol or pentaerythritol, alicyclic and/or aromatic di- and poly-hydroxyl compounds.

The polyol with low molecular weight can be a linear polyol with low molecular weight and/or a branched diol with low molecular weight.

The linear polyol with low molecular weight is one or more selected from the group consisting of 1,2-ethanediol (ethylene glycol), 1,3-propylene glycol, 1,4-butanediol, 1,5-pentanediol, 1,6-hexanediol, 1,7-heptanediol, 1,8-octanediol, 1,9-nonanediol, 1,10-decanediol and 1,3-butanediol. One or more selected from the group consisting of 1,3- and 1,4-butanediol, 1,6-hexanediol and 1,8-octanediol is preferable.

The branched polyol with low molecular weight is one or more selected from the group consisting of neopentanediol, 1,2-propylene glycol, 2-methyl-1,2-propylene glycol, 2-methyl-1,3-propylene glycol, 1,2-butanediol, meso-2,3-butanediol, 2,3-dimethyl-2,3-butanediol, 1,2-pentanediol, 2,3-pentanediol, 2,4-pentanediol, 1,4-pentanediol, 2,2,4-dimethyl-1,3-pentanediol, 1,3-hexanediol, 1,4-hexanediol, 1,5-hexanediol, 2,5-hexanediol, 2,5-dimethyl-2,5-hexanediol, 1,3-cylcobutanediol, 2,2,4,4-tetramethylcyclobutanediol, 1,2-cyclopentanediol, 1,3-cyclopentanediol, 1,3-dimethyl-1,3-cyclopentanediol, 1,2-cyclohexanediol, 1,3-cyclohexanediol, 1,4-cyclohexanediol and 1,4-dihydroxymethyl cyclohexane. One or more selected from the group consisting of neopentanediol, methyl-1,3-propylene glycol and 2,2,4-dimethyl-1,3-pentanediol is preferable.

The polyester polyol may also be a lactone homopolymer or mixed polymer, which is obtained preferably by the addition of a lactone or a mixture of lactones, e.g. butyrolactone, ε-caprolactone and/or methyl-ε-caprolactone onto a suitable initiator molecular having two and/or more functionalities. The ε-caprolactone is preferably in the form of a polymer of ε-caprolactone.

Polyether Polyol with Low Functionality

The term polyether polyol with low functionality is generally understood to be a polyether polyol with a functionality not more than 2.

The polyether polyol with low functionality can have a hydroxyl value of 50-700 mg KOH/g, preferably 100-600 mg KOH/g.

The polyether polyol with low functionality can have a number-average molecular weight of 400 to 4000 g/mol, preferably 400 to 3500 g/mol, measured at 23° C. by gel permeation chromatography with tetrahydrofuran as the mobile phase and polystyrene as the standard for calibration.

The polyether polyol with low functionality is selected from a polyaddition product of alkylene oxide, a condensation product of polyol or mixture of polyol, or an alkoxylation product of multifunctional alcohol, amine and alkamine.

The polyaddition product of alkylene oxide is preferably a polyaddition product of ethylene oxide, 1,2-propylene oxide, 1,2-butylene oxide, 2,3-butylene oxide, tetrahydrofuran, chlorinated styrene or epichlorohydrin, and a mixed addition product and graft product thereof.

When the polyether polyol with low functionality has a functionality of 2, the polyether polyol with low functionality can be an alkoxylation product of a starter molecule with a hydroxyl group, such as glycol, 1,2-propylene glycol, 1,3-propylene glycol, 1,4-butanediol, hexanediol, diglycol, trimethylolpropane, glycerol, pentaerythritol, sorbitol or a mixture thereof, with propylene oxide or butylene oxide.

The polyether polyol with low functionality having a functionality of 2 is preferably water soluble.

When the polyether polyol with low functionality has a functionality of 1, the polyether polyol is preferably a non-ionic, hydrophilic mono-functional polyether polyol.

The non-ionic, hydrophilic mono-functional polyether polyol is selected from the group consisting of monofunctional alkoxyl polyethylene polyol, such as polyethylene glycol monomethyl ether, mono-functional monoalkyl ether polyether polyol or mono-functional polyetheramine.

The polyethylene glycol monomethyl ether can be MPEG Carbowax® 2000 or Methoxy PEG-40, with a number-average molecular weight of 1800-2200 g/mol, available from the Dow Chemical Company.

The mono-functional monoalkyl ether polyether polyol can be LB25, obtained from components comprising butanol, ethylene oxide and propylene oxide, with a number-average molecular weight of 2250 g/mol, available from Covestro Deutschland AG.

The mono-functional polyetheramine can be Jeffamine® M1000 or Jeffamine® M2070, both available from Huntsman Company.

The non-ionic, hydrophilic mono-functional polyether polyol is more preferably MPEG Carbowax® 2000, LB25 or Jeffamine® M2070, most preferably MPEG Carbowax® 2000 or LB25.

Polycarbonate Polyether Polyol

The polycarbonate polyether polyol can be a polyol based on dimethylcarbonate and hexanediol and/or butanediol and/or ε-caprolactone, preferably a polyol based on dimethyl carbonate and hexanediol and/or ε-caprolactone.

Component A4) a Hydroxyl Functional Compound Having a Molecular Weight of 32-400 g/mol The hydroxyl functional compound can be a polyol having at most 20 carbon atoms, such as one or more selected from the group consisting of glycol, diethylene glycol, triethylene glycol, 1,2-propylene glycol, 1,3-propylene glycol, 1,4-butanediol, 1,3-butanediol, cyclohexanediol, 1,4-cyclohexane dimethanol, 1,6-hexanediol, neopentanediol, hydroquinone dihydroxyethyl ether, bisphenol A (2,2-bis(4-hydroxyphenyl)propane), hydrogenated bisphenol A (2,2-bis(4-hydroxylcyclohexyl)propane), trimethylolpropane, glycerol and pentaerythritol.

The hydroxyl functional compound can also be an ester diol, such as one or more selected from the group consisting of α-hydroxyl butyl-ε-hydroxyl hexanoate, ω-hydroxyl hexyl-γ-hydroxybutyrate, β-hydroxyethyl adipate or β-hydroxyethyl terephthalate.

The hydroxyl functional compound can also be a mono-functional or isocyanate-reactive, hydroxyl function-containing compound. The mono-functional or isocyanate-reactive, hydroxyl function-containing compound can be one or more selected from the group consisting of ethanol, n-butanol, ethylene glycol monobutyl ether, diethylene glycol monomethyl ether, ethylene glycol monobutyl ether, diethylene glycol monobutyl ether, propylene glycol monomethyl ether, dipropylene glycol monomethyl ether, tripropylene glycol monomethyl ether, dipropylene glycol monopropyl ether, propylene glycol monobutyl ether, dipropylene glycol monobutyl ether, tripropylene glycol monobutyl ether, 2-ethylhexanol, 1-octanol, 1-dodecanol, 1-hexadecanol, 1,6-hexanediol, 1,4-butanediol, neopentanediol and trimethylolpropane, preferably one or more selected from the group consisting of 1,6-hexanediol, 1,4-butanediol, neopentanediol and trimethylolpropane.

Component A5) Isocyanate-Reactive Anionic Hydrophilizing Agent or Potential Anionic Hydrophilizing Agent The isocyanate-reactive anionic hydrophilizing agent or potential anionic hydrophilizing agent comprises at least one isocyanate-reactive group, e.g. hydroxyl, and at least one functional group such as —COO-M$^+$, —SO$_3$M$^+$, —PO(O$^-$M$^+$)$_2$, wherein M$^+$ can be a metal cation, H$^+$, NH$_4^+$, NHR$_3^+$, wherein R can be C$_1$-C$_{12}$ alkyl, C$_5$-C$_6$ cycloalkyl and/or C$_2$-C$_4$ hydroxyl alkyl. A dissociation balance depending on pH is achieved upon the interaction between the functional group and the aqueous media, and thus an electronegativity or electroneutrality is achieved.

The isocyanate-reactive anionic hydrophilizing agent or potential anionic hydrophilizing agent is preferably mono- and di-hydroxyl carboxylic acid, mono- and di-hydroxyl sulfonic acid, mono- and di-hydroxyl phosphonic acid, and salts thereof. It further preferably comprises a carboxylate radical or group and/or sulfonate group.

Isocyanate-Reactive Component B)

The isocyanate-reactive component B) can be reacted with a part or all of the free isocyanate groups (NCO) of the polyurethane prepolymer A) for chain extension.

The isocyanate-reactive component B) can be an amino-compound with an amino functionality of not less than 1, preferably 1-3, most preferably 2.

The amino-compound can be used in an amount of 0.1-10 wt.-%, based on the amount of the reaction mixture as 100 wt.-%.

The isocyanate-reactive component B) can be an anionic hydrophilizing agent or a potential anionic hydrophilizing agent.

The isocyanate-reactive component B) is preferably a compound comprising sulfonium, ammonium, phosphonium, carboxylate, sulfonate, phosphonate group or a group capable of being converted through salification into the groups above. The appropriate isocyanate-reactive group is preferably hydroxyl and/or amino group.

The isocyanate-reactive component B) is preferably mono- and di-hydroxyl carboxylic acid, mono- and di-amino carboxylic acid, mono- and di-hydroxyl sulfonic acid, mono- and di-amino sulfonic acid, and mono- and di-hydroxyl phosphonic acid, or mono- and di-amino phosphonic acid, and salts thereof. Examples comprise dimethylolpropionic acid, dimethylol butyric acid, hydroxyl pentanoic acid, N-(2-amino ethyl)-β-alanine, 2-(2-amino ethyl amino) ethane sulfonic acid, ethylene diamine-propyl or -butyl sulfonic acid, 1,2- or 1,3-propylene diamine-β-ethyl sulfonic acid, malic acid, citric acid, glycolic acid, lactic acid, glycine, alanine, taurine, lysine, 3,5-diamino benzoic acid, an addition product of IPDI and acrylic acid (see, EP-A0916647, example 1) and alkali metal salts and/or ammonium salts thereof, an addition product of sodium bisulfite onto but-2-ene-1,4-diol, polyether sulfonate or a propoxylated addition product of 2-butanediol and NaHSO$_3$.

The isocyanate-reactive component B) is preferably one or more selected from the group consisting of mono- and di-hydroxyl carboxylic acid, mono- and di-amino monocarboxylic acid, mono- and di-hydroxyl sulfonic acid, mono- and di-amino sulfonic acid and salts thereof. A salt having a functionality of 1.9-2.1 and comprising sulfonate group as an ionic or potential ionic group is most preferable, such as salt of N-(2-amino ethyl)-alanine, salt of 2-(2-amino ethyl amino) ethane sulfonic acid or salt of the addition product of IPDI and acrylic acid.

Amino Functional Compound C Having a Molecular Weight of 32-400 g/Mol

The compound C) having a molecular weight of 32-400 g/mol is one or more selected from the group consisting of ethylene diamine, 1,2- and 1,3-diaminopropane, 1,4-diaminobutane, 1,6-diaminohexane, isophorone diamine, mixtures of 2,2,4- and 2,4,4-trimethyl hexamethylenediamine isomers, 8-methyl pentamethylene diamine, diethylene triamine, 1,3- and 1,4-xylylene diamine, a, a, a', a'-tetramethyl-1,3- and -1,4-xylyene diamine, 4,4-diamino dicyclohexyl methane and dimethyl ethylene diamine.

The component C) amino functional compound having a molecular weight of 32-400 g/mol is generally used as a chain terminator.

Neutralizer

The reaction mixture can further comprise a neutralizer.

The neutralizer can be ammonia, ammonium carbonate, bicarbonate, trimethylamine, triethylamine, tributylamine, diisopropyl ethyl amine, dimethyl ethanolamine, diethyl ethanolamine, triethanolamine, lithium hydroxide, sodium hydroxide, potassium hydroxide or sodium carbonate. Triethylamine, triethanolamine, dimethyl ethanolamine, sodium hydroxide, potassium hydroxide, diisopropyl ethyl amine, sulfate dimethyl ether or succinic acid is preferable. Sodium hydroxide or potassium hydroxide is most preferable.

Method for Preparing the Aqueous Dispersion of Polyurethane

According to a preferred embodiment of the invention, the method for preparing the aqueous dispersion of polyurethane provided by the invention comprises the following steps:

a. Obtaining polyurethane prepolymer A) from a reaction comprising component A1), component A2), optional component A3), optional component A4) and optional component A5);

b. Reacting said polyurethane prepolymer A) with the isocyanate-reactive component B) and the optional amino functional compound C) having a molecular weight of 32 to 400 g/mol to obtain a polyurethane polymer; and c. Introducing water prior to, during or after step b to obtain said aqueous dispersion of polyurethane.

In said step c, water is preferably introduced after step b to obtain said aqueous dispersion of polyurethane.

The aqueous dispersion of polyurethane can be prepared by a process of mixing prepolymers, acetone process or melt dispersion process, preferably the acetone process.

For the acetone process, all or a part of components A1)-A5) are firstly incorporate to prepare a polyurethane prepolymer, and optionally are diluted with a solvent miscible with water but inert to the isocyanate group, and are heated to 50-120° C.

In order to accelerate the reaction rate of step a, a catalyst conventionally used for preparing a polyurethane prepolymer, such as dibutyl tin dilaurate, can be used.

The solvent can be a conventional keto functional aliphatic solvent, such as acetone or 2-butanone. The solvent can be added only at the beginning of the preparation, or can also be added with a further portion during the preparation if needed.

The solvent can also be xylene, toluene, cyclohexane, butyl acetate, methoxy propyl acetate, N-methyl pyrrolidone, N-ethyl pyrrolidone, a solvent containing ether or ester units.

Any of components A1)-A5) not added at the beginning of reaction is subsequently metered.

Components A1)-A5) are converted partially or completely into an isocyanate functional polyurethane prepolymer, preferably completely converted.

The polyurethane prepolymer can be in a solid state or a liquid state.

If the polyurethane prepolymer obtained is not dissolved yet or is only partially dissolved, the polyurethane prepolymer is further dissolved by means of aliphatic ketone, e.g. acetone or 2-butanone.

Potential ionic groups, if any, present in the polyurethane prepolymer A) are converted into ionic form through a partial or complete reaction with the neutralizer. The neutralization can reach an extent of 50-125 mol %, preferably 70-100 mol %.

If the dispersing water comprises a neutralizer already, the neutralization can also occur simultaneously with dispersion.

In step b, component B) and optionally component C) are reacted partially or completely with the residual isocyanate group of the polyurethane prepolymer obtained from step a for chain extension. The extent of chain extension, namely the equivalence ratio of the isocyanate-reactive groups of the compound used for chain extension to the free isocyanate groups (NCO) of the polyurethane prepolymer, can be 40-100 mol %, preferably 50-100 mol %. Component B) and component C) can be used as a dilution with water or solvent, alone or as a mixture, with an arbitrary sequence for addition.

The content of water or solvent is preferably 70-95 wt.-%.

The step c can involve a strong shearing, such as intense agitation.

Solvent present in the aqueous dispersion of polyurethane can be removed by distillation. The solvent can be removed during step b or step c.

The residual organic solvent in the aqueous dispersion of polyurethane is preferably in an amount of less than 1.0 wt.-%, based on the amount of aqueous dispersion of polyurethane as 100 wt.-%.

Process of Producing a Coated Product

Coating a substrate with a coating composition comprising the aqueous dispersion of polyurethane can be conducted for several times, wherein the coating composition comprising the aqueous dispersion of polyurethane can be same or different for each time.

According to an embodiment of the present invention, a substrate is coated with a coating composition comprising the aqueous dispersion of polyurethane, which aqueous dispersion is obtained by a reaction of a reaction mixture comprising a polyurethane prepolymer A) and an isocyanate-reactive component B), said polyurethane prepolymer A) being obtained by a reaction comprising the following components:

A1) a polyisocyanate having a functionality not less than 2, the polyisocyanate comprising alicyclic polyisocyanate;

A2) a multifunctional polyether polyol which has a functionality of 3-8 in an amount of 1% to 30% by weight, based on the amount of said reaction mixture as 100% by weight; and A3) polycarbonate polyol and polyester polyol.

The coat formed by the aqueous dispersion of polyurethane above is further coated with a coating composition comprising the aqueous dispersion of polyurethane on the surface, which aqueous dispersion is obtained by a reaction of a reaction mixture comprising a polyurethane prepolymer A) and an isocyanate-reactive component B), said polyurethane prepolymer A) being obtained by a reaction comprising the following components:

A1) a polyisocyanate having a functionality not less than 2, the polyisocyanate comprising alicyclic polyisocyanate;

A2) a multifunctional polyether polyol which has a functionality of 3-8 in an amount of 1% to 30% by weight, based on the amount of said reaction mixture as 100% by weight; and A3) polyester polyol.

The process for producing the coated product can further comprise a step of drying the substrate.

Preferably, the drying is carried out firstly at a temperature not higher than 100° C., followed by raising the drying temperature to 100° C. or more.

EXAMPLES

All percentages involved in the present invention are percent by weight, unless otherwise indicated.

The analysis and measurement of the present invention were all made at 23° C., unless otherwise indicated.

The number-average molecular weight according to the present invention was measured with a gel permeation chromatography at 23° C., using tetrahydrofuran as the mobile phase and polystyrene as the standard for calibration.

The solid content of the aqueous dispersion of polyurethane was measured according to DIN-EN ISO 3251 using a HS153 moisture meter from Mettler Toledo Company.

The content of isocyanate group (NCO) was measured by volume according to DIN-EN ISO 11909.

The particle size of aqueous dispersion of polyurethane was measured using laser spectrometry (Zatasizer Nano ZS 3600 laser particle size analyzer from Malvern Instrument Company) after dilution with deionized water.

The viscosity of aqueous dispersion of the aqueous dispersion of polyurethane was measured according to DIN 53019 at 23° C., using a rotational viscometer DV-II+Pro from Brookfield company.

PH value was measured at 23° C. using a PB-10 pH meter from Sartorius Company, Germany.

Water vapor transmission rate (WVTR) denotes the amount of water vapor permeating through a 1 $m^2$ of fabric sample in 24 hours at a specific temperature under a specific relative humidity, with a specific water vapor pressure difference and a specific coat thickness, represented with a unit $g/m^2/24$ h. WVTR was measured according to DS2109 TM1, using a water vapor transmission rate meter from British Textile Technology Group, Britain.

Hydrostatic pressure is also called as hydrostatic head (HSH), denotes the water pressure capable of being supported by a unit area of fabric, with a unit mm. For example, a hydrostatic pressure of 5000 mm means that a unit area of fabric can support a maximum hydraulic pressure of 5 m without leakage. HSH was measured according to DIN EN20811:1992 at 20° C., using a hydrostatic pressure tester from PFAFF Company.

Raw Materials and Reagents

| | |
|---|---|
| Desmodur® H | 1,6-hexamethylene diisocyanate, available from Covestro Deutschland AG, Germany, used as the polyisocyanate of component A1). |
| Desmodur® I | Isophorone diisocyanate, available from Covestro Deutschland AG, Germany, used as the polyisocyanate of component A1). |
| Desmodur® W | Dicyclohexyl methane diisocyanate, available from Covestro Deutschland AG, Germany, used as the polyisocyanate of component A1). |
| Desmophen® 3170 | A polyether polyol based on polypropylene oxide and polyethylene oxide, having a functionality of 6, a number-average molecular weight of 3300 g/mol, and a content of oxyethylene group of 81 wt.-%, available from Covestro Deutschland AG, Germany, used as the multifunctional polyether polyol of component A2). |
| Desmophen® 41WB09 | A polyether polyol based on polypropylene oxide and polyethylene oxide, having a functionality of 3, a number-average molecular weight of 4550 g/mol, and a content of oxyethylene group of 71 wt.-%, available from Covestro Deutschland AG, Germany, used as the multifunctional polyether polyol of component A2). |
| Desmophen® PE170HN | Polyester polyol, having an OH value of 66 mg KOH/g and a number-average molecular weight of 1700 g/mol, available from Covestro Deutschland AG, Germany, used as component A3), the polymeric polyol different from the multifunctional polyether polyol. |
| Desmophen® C2200 | Polycarbonate polyol of hexanediol and dimethyl carbonate, having an OH value of 56 mg KOH/g and a number-average molecular weight of 2000 g/mol, available from Covestro Deutschland AG, Germany, used as component A3), the polymeric polyol different from the multifunctional polyether polyol. |
| Desmophen® L300 | Polyether polyol with low functionality, having a functionality of 2 and a number-average molecular weight of 2000 g/mol, available from Covestro Deutschland AG, Germany, used as component A3), the polymeric polyol different from the multifunctional polyether polyol. |
| Desmophen® 3600 | Polyether polyol with low functionality, having a functionality of 2 and a number-average molecular weight of 2000 g/mol, available from Covestro Deutschland AG, Germany, used as component A3), the polymeric polyol different from the multifunctional polyether polyol. |
| Desmophen® LP112 | Polypropylene oxide diol, having a functionality of 2 and a number-average molecular weight of 1000 g/mol, available from Covestro Deutschland AG, Germany, used as component A3), the polymeric polyol different from the multifunctional polyether polyol. |
| LB25 | Mono-functional polyether polyol based on ethylene oxide/propylene oxide, having a number-average molecular weight of 2250 g/mol, available from Covestro Co., Ltd, Germany, used as component A3), the polymeric polyol different from the multifunctional polyether polyol. |
| DMPA | 2,2-dihydroxymethyl malonic acid, available from Aldrich chemical reagent company, Germany, used as the isocyanate-reactive anionic hydrophilizing agent or potential anionic hydrophilizing agent of component A5). |
| AAS | Sodium diaminosulfonate, $NH_2-CH_2CH_2-NH-CH_2CH_2-SO_3Na$, at a concentration of 45% in water, available from Covestro Deutschland AG, Germany, used as the isocyanate-reactive component of component B). |
| KV1386 | Monosodium salt of N-(2-amino ethyl)-β-alanine, available from Covestro Deutschland AG, Germany, used as the isocyanate-reactive component of component B). |
| EDA | Ethylene diamine, available from Jiaxing Jinyan Chemical Co., Ltd., China, used as the amino functional compound of component C). |
| IPDA | Isophorone diamine, available from Covestro Deutschland AG, Germany, used as the amino functional compound of component C). |
| Impranil® DLU | Dispersion of anionic/non-ionic aliphatic polycarbonate-polyether polyurethane, having a solid content of 60 wt.-%, available from Covestro Deutschland AG, Germany, used as the aqueous dispersion of polyurethane for comparative examples. |

Example 1

371 g Desmophen® PE170HN and 7.5 g Desmophen® 3170 were heated to 65° C., and 105.66 g Desmodur® W was added to provide a mixture. The mixture was stirred at 120° C. until the actual NCO value of the mixture was less than the theoretical NCO value, providing a polyurethane prepolymer. The prepolymer was dissolved at 40° C. with 860.8 g acetone, and then a solution of 61.7 g AAS and 168.94 g water was metered in. After stirring for 15 minutes, 885.1 g water was added for dispersion, and the solvent was removed through vacuum distillation to provide an aqueous dispersion of polyurethane. The aqueous dispersion of polyurethane had a solid content of 33.14%, a particle size of 108.3 nm, a viscosity of 98 mPa·s and a pH of 7.73.

Example 2

168.2 g Desmophen® C2200, 19.2 g Desmophen® L300, 53.2 g Desmophen® 3600, 77.6 g LB25, 5 g DMPA and 29.3 g Desmophen® 3170 were heated at 100° C. for 1 h, followed by cooling to 75° C. 54.3 g Desmodur® W and 34.8 g Desmodur® H were added to provide a mixture, and the mixture was stirred at 100-110° C. until the actual NCO value of the mixture was less than the theoretical NCO value, providing a polyurethane prepolymer. The prepolymer was dissolved at 80° C. with 797.4 g acetone, followed by cooling to 40° C. Then, a solution of 11.5 g DEA (available from Aldrich chemical reagent company, Germany), 3.3 g EDA and 108.3 g water were metered in. After stirring at 40° C. for 30 minutes, 972.8 g water was added for dispersion, and the solvent was removed through vacuum distillation to provide an aqueous dispersion of polyurethane. The aqueous dispersion of polyurethane had a solid content of 30.7%, a particle size of 57.9 nm, a viscosity of 926 mPa·s and a pH of 5.9.

Example 3

168.2 g Desmophen® C2200, 36.5 g Desmophen® L300, 53.2 g Desmophen® 3600, 77.6 g LB25, 5 g DMPA and 22.3 g Desmophen® 3170 were heated at 100° C. for 1 h, followed by cooling to 75° C. 54.3 g Desmodur® W and 34.8 g Desmodur® H were added to provide a mixture, and the mixture was stirred at 100-110° C. until the actual NCO value of the mixture was less than the theoretical NCO value, providing a polyurethane prepolymer. The prepolymer was dissolved at 80° C. with 785.7 g acetone, followed by cooling to 40° C. Then, a solution of 11.5 g DEA, 3.3 g EDA and 108.3 g water were metered in. After stirring at 40° C. for 30 minutes, 957.4 g water was added for dispersion, and the solvent was removed through vacuum distillation to provide an aqueous dispersion of polyurethane. The aqueous dispersion of polyurethane had a solid content of 30.4%, a particle size of 48.2 nm, a viscosity of 250 mPa·s and a pH of 5.9.

Example 4

168.2 g Desmophen® C2200, 19.2 g Desmophen® L300, 40 g Desmophen® 3600, 6.6 g Desmophen® LP112, 77.6 g LB25, 5 g DMPA and 22.3 g Desmophen® 3170 were heated at 100° C. for 1 h, followed by cooling to 75° C. 54.3 g Desmodur® W and 34.8 g Desmodur® H were added to provide a mixture, and the mixture was stirred at 100-110° C. until the actual NCO value of the mixture was less than the theoretical NCO value, providing a polyurethane prepolymer. The prepolymer was dissolved at 80° C. with 785.7 g acetone, followed by cooling to 40° C. Then, a solution of 11.5 g DEA, 4.5 g EDA and 116.9 g water were metered in. After stirring at 40° C. for 30 minutes, 951.5 g water was added for dispersion, and the solvent was removed through vacuum distillation to provide an aqueous dispersion of polyurethane. The aqueous dispersion of polyurethane had a solid content of 30.5%, a particle size of 84.9 nm, a viscosity of 2467 mPa·s and a pH of 5.8.

Example 5

168.2 g Desmophen® C2200, 19.2 g Desmophen® L300, 53.2 g Desmophen® 3600, 77.6 g LB25, 5 g DMPA and 29.3 g Desmophen® 3170 were heated at 100° C. for 1 h, followed by cooling to 75° C. 108.5 g Desmodur® W was added to provide a mixture, and the mixture was stirred at 100-110° C. until the actual NCO value of the mixture was less than the theoretical NCO value, providing a polyurethane prepolymer. The prepolymer was dissolved at 80° C. with 832 g acetone, followed by cooling to 40° C. Then, a solution of 11.5 g DEA, 3.3 g EDA and 108.3 g water were metered in. After stirring at 40° C. for 30 minutes, 1018 g water was added for dispersion, and the solvent was removed through vacuum distillation to provide an aqueous dispersion of polyurethane. The aqueous dispersion of polyurethane had a solid content of 30.2%, a particle size of 45.3 nm, a viscosity of 69 mPa·s and a pH of 6.1.

Example 6

168.2 g Desmophen® C2200, 53.2 g Desmophen® 3600, 77.6 g LB25, 5 g DMPA and 29.3 g Desmophen® 3170 were heated at 100° C. for 1 h, followed by cooling to 75° C. 27.13 g Desmodur® W and 52.18 g Desmodur® H were added to provide a mixture, and the mixture was stirred at 100-110° C. until the actual NCO value of the mixture was less than the theoretical NCO value, providing a polyurethane prepolymer. The prepolymer was dissolved at 80° C. with 746 g acetone, followed by cooling to 40° C. Then, a solution of 11.5 g DEA, 3.3 g EDA and 108.3 g water were metered in. After stirring at 40° C. for 30 minutes, 902.3 g water was added for dispersion, and the solvent was removed through vacuum distillation to provide an aqueous dispersion of polyurethane. The aqueous dispersion of polyurethane had a solid content of 30.3%, a particle size of 84.2 nm, a viscosity of 1552 mPa·s and a pH of 6.1.

Example 7

168.2 g Desmophen® C2200, 53.2 g Desmophen® 3600, 77.6 g LB25, 5 g DMPA and 29.3 g Desmophen® 3170 were heated at 100° C. for 1 h, followed by cooling to 75° C. 54.3 g Desmodur® W and 34.8 g Desmodur® H were added to provide a mixture, and the mixture was stirred at 100-110° C. until the actual NCO value of the mixture was less than the theoretical NCO value, providing a polyurethane prepolymer. The prepolymer was dissolved at 80° C. with 763 g acetone, followed by cooling to 40° C. Then, a solution of 11.5 g DEA, 3.3 g EDA and 108.3 g water were metered in. After stirring at 40° C. for 30 minutes, 905.3 g water was added for dispersion, and the solvent was removed through vacuum distillation to provide an aqueous dispersion of polyurethane. The aqueous dispersion of polyurethane had a solid content of 30.7%, a particle size of 131.2 nm, a viscosity of 712 mPa·s and a pH of 6.2.

Example 8

168.2 g Desmophen® C2200, 53.2 g Desmophen® 3600, 77.6 g LB25, 5 g DMPA and 29.3 g Desmophen® 3170 were heated at 100° C. for 1 h, followed by cooling to 75° C. 108.5 g Desmodur® W was added to provide a mixture, and the mixture was stirred at 100-110° C. until the actual NCO value of the mixture was less than the theoretical NCO value, providing a polyurethane prepolymer. The prepolymer was dissolved at 80° C. with 797.9 g acetone, followed by cooling to 40° C. Then, a solution of 11.5 g DEA, 3.3 g EDA and 108.3 g water were metered in. After stirring at 40° C. for 30 minutes, 973.5 g water was added for dispersion, and the solvent was removed through vacuum distillation to provide an aqueous dispersion of polyurethane. The aqueous dispersion of polyurethane had a solid content of 30.5%, a particle size of 57.5 nm, a viscosity of 68.8 mPa·s and a pH of 6.1.

Example 9

168.2 g Desmophen® C2200, 53.2 g Desmophen® 3600, 77.6 g LB25, 5 g DMPA and 41.9 g Desmophen® 3170 were heated at 100° C. for 1 h, followed by cooling to 75° C. 27.13 g Desmodur® W and 52.18 g Desmodur® H were added to provide a mixture, and the mixture was stirred at 100-110° C. until the actual NCO value of the mixture was less than the theoretical NCO value, providing a polyurethane prepolymer. The prepolymer was dissolved at 80° C. with 755 g acetone, followed by cooling to 40° C. Then, a solution of 11.5 g DEA, 3.3 g EDA and 108.3 g water were metered in. After stirring at 40° C. for 30 minutes, 918 g water was added for dispersion, and the solvent was removed through vacuum distillation to provide an aqueous dispersion of polyurethane. The aqueous dispersion of polyurethane had a solid content of 30.4%, a particle size of 108.9 nm, a viscosity of 2315 mPa·s and a pH of 6.1.

Example 10

363.4 g Desmophen® PE170HN and 7.2 g Desmophen® 41WB09 were heated to 65° C., and 105.66 g Desmodur® W was added to provide a mixture. The mixture was stirred at 120° C. until the actual NCO value of the mixture was less than the theoretical NCO value, providing a polyurethane prepolymer. The prepolymer was dissolved at 40° C. with 846.8 g acetone, and then a solution of 61.7 g AAS and 169.7 g water was metered in. After stirring for 15 minutes, 722.1 g water was added for dispersion, and the solvent was removed through vacuum distillation to provide an aqueous dispersion of polyurethane. The aqueous dispersion of polyurethane had a solid content of 34.03%, a particle size of 134.8 nm, a viscosity of 2079 mPa·s and a pH of 8.1.

Comparative Example 1

595.0 g Desmophen® PE170HN was heated to 65° C., and 164.3 g Desmodur® W was added to provide a mixture. The mixture was stirred at 120° C. until the actual NCO value of the mixture was less than the theoretical NCO value, providing a polyurethane prepolymer. The prepolymer was dissolved at 40° C. with 1349.98 g acetone, and then a solution of 96 g AAS and 168.9 g water was metered in. After stirring for 15 minutes, 1404.5 g water was added for dispersion, and the solvent was removed through vacuum distillation to provide an aqueous dispersion of polyurethane. The aqueous dispersion of polyurethane had a solid content of 37.9%, a particle size of 149 nm, a viscosity of 421 mPa·s and a pH of 9.45.

Comparative Example 2

382.5 g Desmophen® PE170HN was heated to 65° C., and 105.66 g Desmodur® W was added to provide a mixture. The mixture was stirred at 125-130° C. until the actual NCO value of the mixture was less than the theoretical NCO value, providing a polyurethane prepolymer. The prepolymer was dissolved at 40° C. with 867.8 g acetone, and then a solution of 61.7 g AAS and 111.86 g water was metered in. After stirring for 15 minutes, 628.1 g water was added for dispersion, and the solvent was removed through vacuum distillation to provide an aqueous dispersion of polyurethane. The aqueous dispersion of polyurethane had a solid content of 41.57%, a particle size of 107.6 nm, a viscosity of 2851 mPa·s and a pH of 8.54.

Comparative Example 3

318.75 g Desmophen® PE170HN was heated to 65° C., and 87.9 g Desmodur® W was added to provide a mixture. The mixture was stirred at 120° C. until the actual NCO value of the mixture was less than the theoretical NCO value, providing a polyurethane prepolymer. The prepolymer was dissolved at 40° C. with 722.9 g acetone, and then a solution of 32.9 g AAS, 1.6 g EDA and 102.1 g water was metered in. After stirring for 15 minutes, 514.4 g water was added for dispersion, and the solvent was removed through vacuum distillation to provide an aqueous dispersion of polyurethane. The aqueous dispersion of polyurethane had a solid content of 40.0%, a particle size of 116.2 nm, a viscosity of 58 mPa·s and a pH of 7.4.

Comparative Example 4

382.5 g Desmophen® PE170HN was heated to 65° C., and 105.66 g Desmodur® W was added to provide a mixture. The mixture was stirred at 125-130° C. until the actual NCO value of the mixture was less than the theoretical NCO value, providing a polyurethane prepolymer. The prepolymer was dissolved at 40° C. with 867.8 g acetone, and then a solution of 48 g KV1386 and 144 g water was metered in. After stirring for 15 minutes, 588.2 g water was added for dispersion, and the solvent was removed through vacuum distillation to provide an aqueous dispersion of polyurethane. The aqueous dispersion of polyurethane had a solid content of 41.24%, a particle size of 207.8 nm, a viscosity of 28 mPa·s and a pH of 7.75.

Comparative Example 5

168.2 g Desmophen® C2200, 38.35 g Desmophen® L300, 53.2 g Desmophen® 3600, 77.6 g LB25 and 5 g DMPA were heated to 75° C. 69.58 g Desmodur® H was added to provide a mixture. The mixture was stirred at 100° C. until the actual NCO value of the mixture was less than the theoretical NCO value, providing a polyurethane prepolymer. The prepolymer was dissolved at 40° C. with 732.37 g acetone, and then a solution of 11.5 g DEA, 3.28 g EDA and 108.3 g water was metered in. After stirring for 30 minutes, 887.4 g water was added for dispersion, and the solvent was removed through vacuum distillation to provide an aqueous dispersion of polyurethane. The aqueous dispersion of polyurethane had a solid content of 31.1%, a particle size of 344.1 nm, a viscosity of 174 mPa·s and a pH of 6.23.

Comparative Example 6

168.2 g Desmophen® C2200, 38.35 g Desmophen® L300, 53.2 g Desmophen® 3600, 77.6 g LB25 and 5 g DMPA were heated at 100° C. for 1 h, followed by cooling to 75° C. 54.3 g Desmodur® W and 34.8 g Desmodur® H were added to provide a mixture. The mixture was stirred at 100-110° C. until the actual NCO value of the mixture was less than the theoretical NCO value, providing a polyurethane prepolymer. The prepolymer was dissolved at 80° C. with 767 g acetone, followed by cooling to 40° C. Then, a solution of 11.5 g DEA, 3.3 g EDA and 108.3 g water were metered in. After stirring at 40° C. for 30 minutes, 932.8 g water was added for dispersion, and the solvent was removed through vacuum distillation to provide an aqueous dispersion of polyurethane. The aqueous dispersion of polyurethane had a solid content of 30.3%, a particle size of 55.1 nm, a viscosity of 92 mPa·s and a pH of 6.0.

Property Testing
Preparation of Coat

Release paper was placed in front of the back roll in a film stretching device composed of two polishing rolls (where the spacing between the two rolls can be adjusted precisely). A clearance gauge was used to adjust the distance between the paper and the front roll. The distance corresponded to the film thickness of the coat (wet) obtained, and could be adjusted pursuant to the thickness required for each coating. A plurality of coatings could also be coated continuously.

The viscosity of the aqueous dispersions of polyurethane obtained from the examples and comparative examples was each adjusted to 4500 mPa·s (adjusted through Borchi Gel ALA). The aqueous dispersion of polyurethane was poured into the clearance between the paper and the front roll, and the release paper was pulled down vertically so as to form a coat on the paper. If several coats were to be coated, then, after drying of one coat, the release paper was reinserted into the device, followed by the coating of another coat.

Test of Water Vapor Transmission Rate (WVTR)

A wet coat with 500 microns was coated onto a VEZ matt release paper, the wet coat being dried at 50° C. for 10 minutes, followed by drying at 150° C. for 3 minutes, and the water vapor transmission rate (WVTR) of the coat being measured, with the results being provided in Table 1.

Hydrostatic Head (HSH) Test

A coat having strength of 37.4 g/cm² was prepared according to DIN 53886. A wet coat with 500 microns was coated onto a VEZ matt release paper, and the wet coating was dried at 50° C. for 10 minutes, followed by drying at 150° C. for 3 minutes. The hydrostatic head value of the coat was tested, with the results being provided in Table 1.

TABLE 1

Water Vapor Transmission Rate and Hydrostatic Head of the Coats Formed in the Examples and Comparative Examples of the Invention

|  | Water Vapor Transmission Rate (WVTR) (g/m²/24 h) | Hydrostatic Head (HSH) (mm) |
|---|---|---|
| Comparative Example 1 | 16559 | >4000 |
| Comparative Example 2 | 7230 | >7000 |
| Comparative Example 3 | 4001 | 6500 |
| Comparative Example 4 | 9407 | >7000 |
| Comparative Example 5 | 21723 | 3000 |
| Comparative Example 6 | N/A | N/A |
| Comparative Example 7 (Impranil ® DLU) | 1487 | >7500 |
| Example 1 | 19090 | >7000 |
| Example 2 | 13261 | >7000 |
| Example 3 | 12702 | >7500 |
| Example 4 | 12468 | >8000 |
| Example 5 | 18622 | >7000 |
| Example 6 | 10533 | >7000 |
| Example 7 | 11889 | >7500 |

N/A: coatings are unable to form films, and thus it is impossible to get the values of water vapor transmission rate or hydrostatic head.

The higher the water vapor transmission rate was, the better the moisture permeability of the waterproof and moisture permeable fabric was. The higher the hydrostatic head value was, the better the waterproof of the waterproof and moisture permeable fabric was. In the field of textile industry, it was generally required that the water vapor transmission rate and hydrostatic head of a waterproof and moisture permeable fabric were at least higher than 5000 g/m²/24 h and 5000 mm, respectively. From Table 1, the coat formed by the aqueous dispersion of polyurethane according to comparative examples either could not balance the water vapor transmission rate and hydrostatic head, or the water vapor transmission rate and hydrostatic head were not high enough. The coat formed by the aqueous dispersion of polyurethane according to the inventive examples not only could balance the water vapor transmission rate and hydrostatic head, but also resulted in water vapor transmission rate and hydrostatic head much higher than those of the comparative examples. It thus could be concluded that the waterproof and moisture permeability of the coat formed by the aqueous dispersion of polyurethane according to the inventive examples were much better than those of the comparative examples.

Washing Resistance Test

The fabric obtained by coating with the aqueous dispersion of polyurethane according to the inventive examples or comparative examples was tested for washing resistance. The coated fabric was water washed at 30° C. for 35 minutes, then dried at room temperature. The water washing and drying steps were repeated once, which process was called as one time of water washing. WVTR and HSH values of the coat of the coated fabric were measured after water washing the coated fabric three or ten times. WVTR and HSH values of the coat of the coated fabric obtained from coating the aqueous dispersion of polyurethane according to the inventive examples and comparative examples prior to and after water washing were listed in Table 2.

TABLE 2

The values of WVTR and HSH prior to and after washing the Fabric Coat Obtained by the coating of the Examples and Comparative Examples of the Invention

|  | prior to washing | | after washing three times | | after washing ten times | |
|---|---|---|---|---|---|---|
|  | WVTR (g/m²/24 h) | HSH (mm) | WVTR (g/m²/24 h) | HSH (mm) | WVTR (g/m²/24 h) | HSH (mm) |
| Comparative Example 2 | 7230 | >7000 | 9264 | 1000 | — | — |
| Comparative Example 4 | 9407 | >7000 | 296 | 7000 | — | — |
| Comparative Example 7 (Impranil ® DLU) | 1487 | >7500 | 1019 | >7000 | — | — |
| Example 2 | 13261 | >7000 | 7411 | >7000 | 8372 | >7000 |
| Example 3 | 12702 | >7500 | 6039 | >7000 | — | — |

TABLE 2-continued

The values of WVTR and HSH prior to and after washing the Fabric Coat Obtained by the coating of the Examples and Comparative Examples of the Invention

| | prior to washing | | after washing three times | | after washing ten times | |
|---|---|---|---|---|---|---|
| | WVTR (g/m²/24 h) | HSH (mm) | WVTR (g/m²/24 h) | HSH (mm) | WVTR (g/m²/24 h) | HSH (mm) |
| Example 4 | 12468 | >8000 | 7230 | >7000 | — | — |
| Example 6 | 10533 | >7000 | 6088 | 7000 | 7715 | >7500 |
| Double coating (the lower coating is Example 1; the upper coating is Example 6) | 7148 | >7000 | 6778 | >7000 | 9087 | >7000 |

It could be seen from Table 2 that, both the WVTR and HSH values of the coat of the coated fabric obtained from the aqueous dispersion of polyurethane according the comparative examples were significantly less than 5000 after water washing three times, which could not satisfy the requirement by the art on the waterproof and moisture permeability of a waterproof and moisture permeable fabric, representing a poor washing resistance of the waterproof and moisture permeable fabric. The coat of the coated fabric obtained from the aqueous dispersion of polyurethane according to the inventive examples showed a WVTR value higher than 5000 g/m²/24 h and a HSH value higher than 5000 mm after water washing three or ten times, which meant that the fabric still satisfied the requirement by the art on waterproof and moisture permeability of a waterproof and moisture permeable fabric even after water washing three or ten times, representing a good water-washing resistance of the waterproof and moisture permeable fabric.

Those skilled in the art can understand easily that the present invention is not restricted by the details discussed above, while the present invention can be carried out in other special forms without departing the spirit or prominent characters of the present invention. Therefore, interpreted in any views, the Examples of the invention are provided exemplarily without any restriction, such that the range of the invention is defined by the claims instead of the detailed discussion above; and accordingly, any modification, as long as it falls within an interpretation and range defined thereby equivalent to the claims, should be deemed as a part of the invention.

The invention claimed is:

1. An aqueous dispersion of polyurethane, comprising a polyurethane polymer produced by a reaction of a reaction mixture comprising a polyurethane prepolymer A) and an isocyanate-reactive component B), wherein the polyurethane prepolymer A) is produced by a reaction of:
   A1) a polyisocyanate which has a functionality of not less than 2; and
   A2) a multifunctional polyether polyol which has a functionality of not less than 3 in an amount of 1% to 30% by weight, based on the amount of the reaction mixture as 100% by weight, the multifunctional polyether polyol having a number-average molecular weight of 1,800 g/mol to 12,000 g/mol, wherein the multifunctional polyether polyol is produced by a reaction of ethylene oxide and an initiator and has a star structure, and wherein the multifunctional polyether polyol has the following structure:

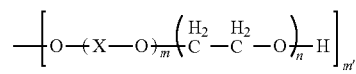

wherein,
   m is 0 to 50;
   n is 1 to 50;
   m' is not less than 3;
   X is one or more selected from the group consisting of propyl, isopropyl, butyl, pentyl, hexyl, heptyl, octyl, nonyl, decyl, undecyl, dodecyl, cyclopentyl, cyclohexyl, cycloheptyl, cyclooctyl, styryl, methylstyryl and pinanyl.

2. The aqueous dispersion of polyurethane according to claim 1, wherein initiator is one or more selected from the group consisting of monosaccharides, oligosaccharides, polysaccharides, pentaerythritol, dipentaerythritol, tripentaerythritol, trimethylolethane, trimethylolpropane, sorbitol, 1,12-dodecanediol, 1,2-decanediol, 1,10-decanediol, cyclic polyol, aromatic hydroxyl compound, polyamine, compounds having carboxylic acid groups, and compounds having hydroxyl and carboxylic acid groups.

3. The aqueous dispersion of polyurethane according to claim 1, wherein the multifunctional polyether polyol is present in an amount of 1 to 15% by weight, based on the amount of said reaction mixture as 100% by weight.

4. The aqueous dispersion of polyurethane according to claim 1, wherein the reaction component of the polyurethane prepolymer A) further comprises component A3) which is a polymeric polyol different from the multifunctional polyether polyol.

5. The aqueous dispersion of polyurethane according to claim 4, wherein the component A3) is one or more selected from the group consisting of a polycarbonate polyol, a polyester polyol and a low-functional polyether polyol.

6. The aqueous dispersion of polyurethane according to claim 5, wherein the weight ratio of the multifunctional polyether polyol to the polycarbonate polyol is from 1:4 to 1:10.

7. The aqueous dispersion of polyurethane according to claim 5, wherein the weight ratio of the multifunctional polyether polyol to the polyester polyol is from 1:20 to 1:40.

8. The aqueous dispersion of polyurethane according to claim 1, wherein the polyisocyanate is selected from the group consisting of aliphatic polyisocyanates and alicyclic polyisocyanates.

9. The aqueous dispersion of polyurethane according to claim 8, wherein the alicyclic polyisocyanate is present in an amount of not less than 25% by weight, based on the amount of component A1) as 100% by weight.

10. The aqueous dispersion of polyurethane according to claim 8, wherein the alicyclic polyisocyanate comprises at least two alicyclic rings.

11. The aqueous dispersion of polyurethane according to claim 1, wherein the isocyanate-reactive component B) is an anionic hydrophilic agent or a potential anionic hydrophilic agent.

12. A method for preparing the aqueous dispersion of polyurethane according to claim 1, comprising the following steps:
   a. reacting component A1) with component A2) to produce the polyurethane prepolymer A);
   b. reacting said polyurethane prepolymer A) with the isocyanate-reactive component B) to produce a polyurethane polymer; and
   c. introducing water prior to, during or after step b to produce the aqueous dispersion of polyurethane.

13. A coating composition comprising the aqueous dispersion of polyurethane according to claim 1.

14. A coated product, comprising a substrate and a coating composition comprising the aqueous dispersion of polyurethane according to claim 1 applied thereon.

15. The coated product according to claim 14, wherein the substrate is selected from the group consisting of wood, plastic, metal, glass, fabric, leather, paper, glass fiber, polymer fiber and graphite fiber.

16. A method for preparing a coated product, comprising applying a coating composition comprising the aqueous dispersion of polyurethane according to claim 1 onto a substrate.

17. The aqueous dispersion of polyurethane according to claim 1, wherein the multifunctional polyether polyol has a functionality of 6.

18. The aqueous dispersion of polyurethane according to claim 1, wherein a molar ratio of isocyanate groups of the polyurethane prepolymer A) to isocyanate-reactive groups of the isocyanate-reactive component B) is from 1.05 to 3.5.

* * * * *